(12) United States Patent
Speh et al.

(10) Patent No.: US 8,205,938 B2
(45) Date of Patent: Jun. 26, 2012

(54) SEAT DEVICE

(75) Inventors: Andreas Speh, Ummendorf (DE);
Jürgen Baumann, Bodman-Ludwigshafen (DE); Oliver Schweizer, Lindenberg (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 118 days.

(21) Appl. No.: 12/522,811

(22) PCT Filed: Jan. 9, 2008

(86) PCT No.: PCT/EP2008/000088
§ 371 (c)(1),
(2), (4) Date: Jan. 15, 2010

(87) PCT Pub. No.: WO2008/083952
PCT Pub. Date: Jul. 17, 2008

(65) Prior Publication Data
US 2010/0133881 A1    Jun. 3, 2010

(30) Foreign Application Priority Data
Jan. 13, 2007  (DE) .................. 10 2007 001 962

(51) Int. Cl.
*A47B 83/02* (2006.01)
*B60N 2/00* (2006.01)

(52) U.S. Cl. .............. 297/163; 297/173; 297/354.12

(58) Field of Classification Search .......... 297/163, 297/173, 354.12, 170
See application file for complete search history.

(56) References Cited

U.S. PATENT DOCUMENTS

| 3,009,737 | A | * | 11/1961 | Burnett ................. 297/146 |
| 4,141,586 | A | | 2/1979 | Goldner et al. |
| 4,431,231 | A | | 2/1984 | Elazari et al. |
| 2009/0015047 | A1 | | 1/2009 | Baumann |
| 2010/0060044 | A1 | * | 3/2010 | Pozzi et al. ............ 297/173 |

FOREIGN PATENT DOCUMENTS

| DE | 2648951 A1 | 5/1978 |
| DE | 30 44 089 | 7/1982 |
| DE | 41 26 427 C1 | 11/1992 |
| DE | 10 2005 009419 A1 | 9/2006 |
| DE | 10 2005 015 237 A1 | 10/2006 |
| JP | 11 059249 A | 3/1999 |

OTHER PUBLICATIONS

International Search Report mailed on Apr. 23, 2008 for the corresponding International patent application No. PCT/EP2008/000088 (English translation enclosed).
German Search Report mailed on Dec. 4, 2007 for the corresponding German patent application No. 10 2007 001 962.0 (German language report enclosed).

* cited by examiner

*Primary Examiner* — Milton Nelson, Jr.
(74) *Attorney, Agent, or Firm* — Posz Law Group, PLC

(57) ABSTRACT

A seat device, in particular a motor vehicle or airplane seat device, has a table mounting unit. It is suggested that the table mounting unit comprises at least one coupling gear.

5 Claims, 2 Drawing Sheets

SEAT DEVICE

CROSS REFERENCE TO RELATED APPLICATIONS

This application is a U.S. national stage application of PCT/EP2008/000088 filed on Jan. 9, 2008, and claims priority to, and incorporates by reference, German patent application No. 10 2007 001 962.0 filed on Jan. 13, 2007.

BACKGROUND

The invention is based on a seat device.

DE 10 2005 015 237 A1 discloses a generic seat device with a table bearing unit which has a lever guided via tracks.

SUMMARY

The invention is based on a seat device, in particular a motor vehicle or aircraft seat device, with a table bearing unit.

It is proposed that the table bearing unit comprises at least one linkage transmission. In this case, a "linkage transmission" is to be understood as meaning in particular a transmission in which at least two movable elements are connected via a connecting rod. By means of a corresponding configuration, a particularly advantageous path of movement of a table and also a mounting with little tendency to jam can be achieved with a lightweight construction.

If the seat device comprises a backrest unit and if at least one correspondence point of the table bearing unit is guided on a path of movement which at least partially corresponds with a path of movement of a correspondence point of the backrest unit, the effect which can advantageously be achieved is that a table which is mounted on the table bearing unit and is in a pivoted-out position can always be guided back easily into an advantageous position against the backrest unit, to be precise in particular if at least a large part of the paths of movement of the correspondence points coincides.

If the seat device has a backrest unit which likewise comprises a linkage transmission, the effect which can be achieved is a path of movement of the backrest unit that is comfortable for a passenger.

In a further refinement of the invention, it is proposed that the seat device has a backrest unit which has at least one pivot axis corresponding with the table bearing unit, as a result of which the paths of movement of the backrest unit and of the table bearing unit can advantageously be coordinated with each other, and in particular can be designed in a structurally simple manner such that they overlap at least partially, and preferably for the most part, to be precise in particular if the backrest unit and the table bearing unit have at least two corresponding pivot axes.

The table bearing unit preferably has a greater range of movement, in particular a greater pivoting range, than a backrest unit of the seat device, as a result of which it can be ensured that a table which is mounted on the table bearing unit can always be carried along together with a backrest of the backrest unit and can nevertheless always be pivoted away from the backrest.

In a further refinement of the invention, it is proposed that the seat device comprises a sliding bearing unit via which the table bearing unit is guided in its movement, thus enabling increased stability to be achieved.

The guidance can be achieved here in a structurally simple manner if the table bearing unit is coupled to a backrest unit of the seat device via the sliding bearing unit.

Owing to the possible reduction in weight, the seat device according to the invention is suitable in particular for an aircraft seat, but in principle a corresponding seat device can also be used in the case of other seats appearing suitable to a person skilled in the art, such as, in particular, in the case of motor vehicle seats, seats for auditoria, etc.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawings.

DETAILED DESCRIPTION

Figure 1:
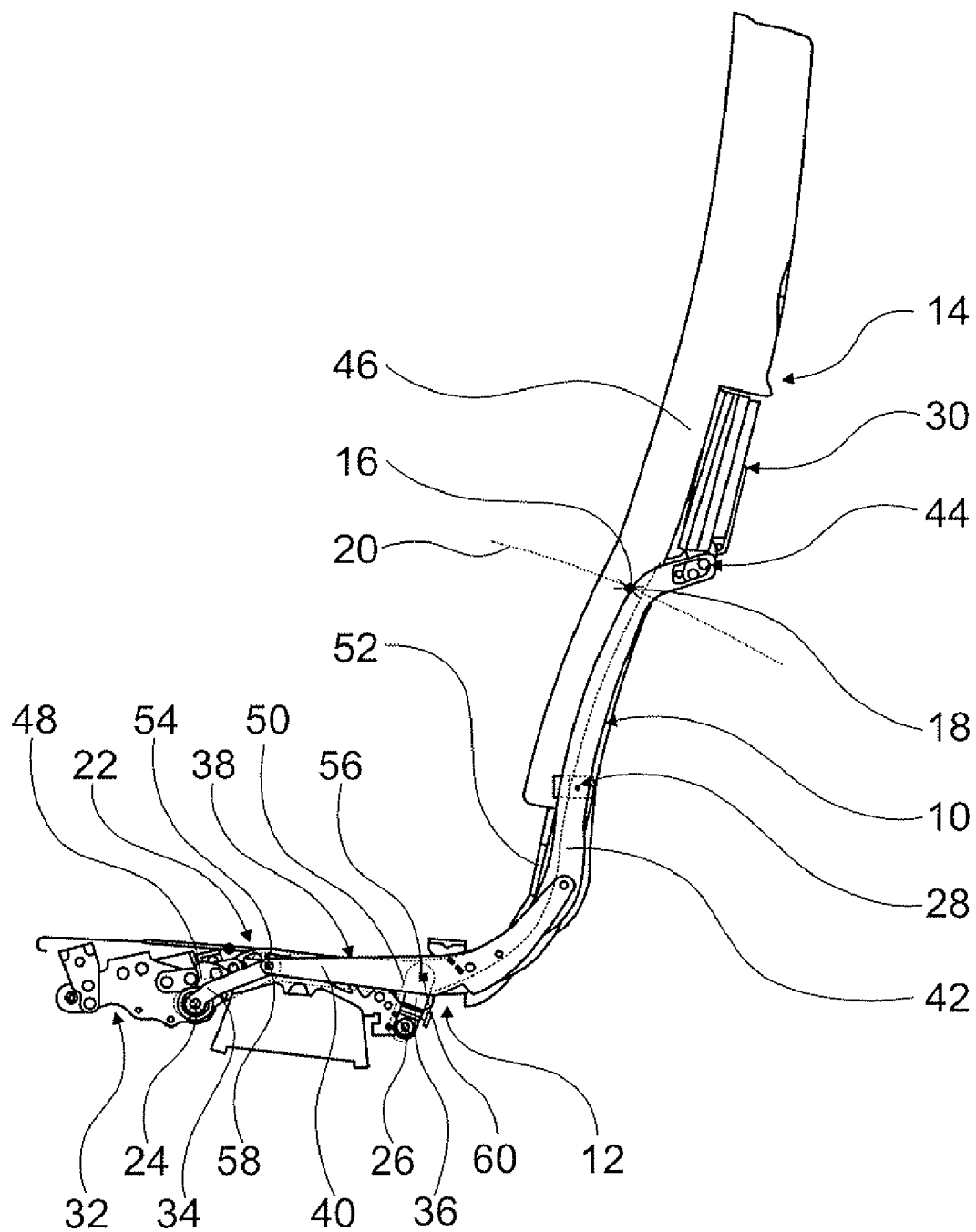
FIG. 1 shows a schematically illustrated aircraft seat with a seat device according to the invention in a first position in a side view.

FIG. 1 shows an aircraft seat with a seat device according to the invention in a first position in a side view. The seat device comprises a backrest unit 14 and a table bearing unit 10 with a table 30 mounted thereon.

According to the invention, the table bearing unit 10 has a bearing unit linkage transmission 12. The bearing unit linkage transmission 12 is of substantially symmetrical design with respect to a central axis of the aircraft seat and, per seat side, comprises in each case two levers 34, 36 mounted pivotably on a seat support unit 32. The description below is restricted to the seat side illustrated, with the seat side which is not illustrated substantially corresponding to the seat side illustrated.

The levers 34, 36 are connected via a connecting rod 38 which comprises two main parts 40, 42 connected fixedly to each other and is of curved design. The levers 34, 36 are respectively coupled via a bearing bolt 54, 56 to the connecting rod 38 in a manner such that they can pivot about a respective pivot axis 58, 60. At an end facing away from the seat support unit 32, bearing means 44 are arranged on the connecting rod 38, by means of which bearing means the table 30 is connected pivotably and displacably to the connecting rod 38.

The backrest unit 14 comprises a backrest unit linkage transmission 22. The table bearing unit 10 and the backrest unit 14 are guided on corresponding paths of movement 20, as illustrated by way of example in FIG. 1 at a correspondence point 16 of the table bearing unit 10 and a correspondence point 18 of the backrest unit 14. In one configuration, in which the table bearing unit 10 and the backrest unit 14, to be precise the table 30 together with a backrest 46 of the backrest unit 14, are coupled by means of a locking unit (not illustrated specifically), the backrest 46 and the connecting rod 38 of the table bearing unit 10 are moved on corresponding paths of movement 20 and the table 30 is carried along on a path of movement exactly corresponding with the backrest 46.

The backrest unit linkage transmission 22 of the backrest unit 14 comprises, per seat side, two levers 48, 50 which are mounted pivotably on the seat support unit 32, with the levers 48, 50 having, on the side facing the seat support unit 32, pivot axes 24, 26 which correspond with the levers 34, 36. The levers 48, 50 are connected via a connecting rod 52 and are each coupled to the connecting rod 52 via a bearing bolt (not illustrated specifically) in a manner such that they can pivot about pivot axes which, in the configuration in which the table 30 is coupled to the backrest 46 by means of the locking unit, correspond with the pivot axes 58, 60.

Figure 2:
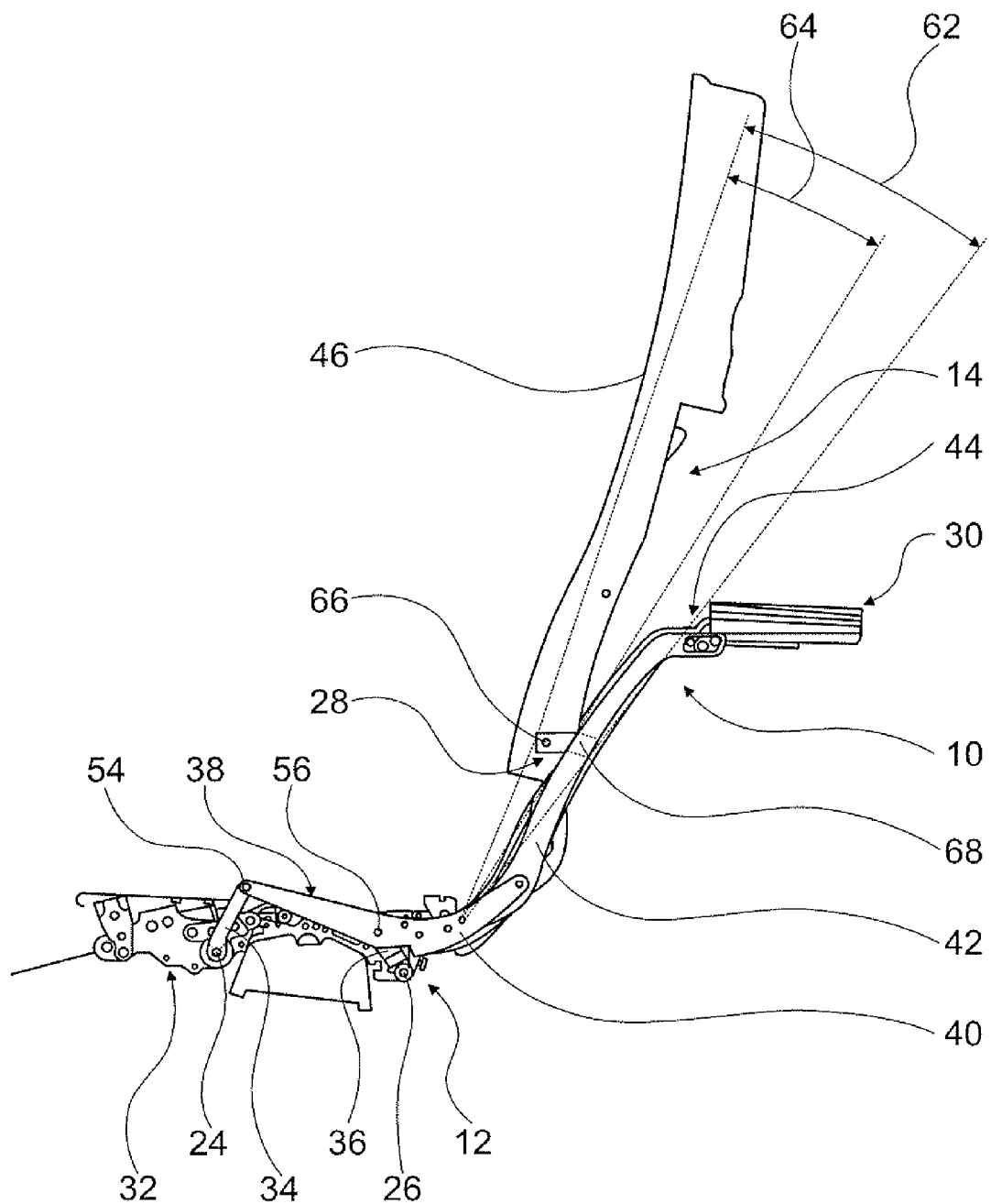
FIG. 2 shows the aircraft seat from FIG. 1 in a second position.

If the table 30 is unlocked, the backrest 46 and the table 30 can be moved independently of each other and, in particular, the table 30 can be pivoted away from the backrest 46 by means of the table bearing unit 10, and, in the pivoted-away state of the table 30, the backrest 46 can be moved independently of the table 30 (FIG. 2). The table bearing unit 10 has a range of movement or a pivoting range 62 which is larger than a range of movement or a pivoting range 64 of the backrest unit 14 such that the table 30 can still be pivoted away from the backrest 46 by means of the table bearing unit 10 if the backrest 46 is very substantially pivoted to the rear from a substantially upright position. In the pivoted-out state (FIG. 2), the table bearing unit 10 bears against a stop (not illustrated specifically). Owing to the corresponding paths of movement 20, it is ensured that, in each position of the backrest 46, the table 30 can be pivoted into a predetermined location on the backrest 46 and can be locked there.

The backrest unit 14 and the table bearing unit 10 are coupled via a sliding bearing unit 28 of the seat device, via which sliding bearing unit the table bearing unit 10, to be precise in particular the connecting rod 38, is guided laterally in its movement. To the side of the backrest 46, the sliding bearing unit 28 has a first sliding bearing means 66 and, on an inner side of the connecting rod 38, has a second sliding bearing means 68 corresponding with the first sliding bearing means 66. The sliding bearing unit 28 is of symmetrical design with respect to the central axis of the aircraft seat and has corresponding sliding bearing means on the seat side which is not illustrated.

The invention claimed is:
1. A seat device, comprising:
a table bearing unit including a bearing unit linkage transmission, the bearing unit linkage transmission further including a first lever and a second lever, the first and second lever connecting to a first curved connecting rod at, and pivoting about, respective first and second pivot axes; and
a backrest unit including a backrest unit linkage transmission, the backrest unit linkage transmission further including a third and a fourth lever, the third lever and fourth lever pivoting about respective third and fourth pivot axes, the third pivot axis corresponding to an end of the first lever opposite of the first pivot axis and the fourth pivot axis corresponding to an end of the second lever opposite of the second pivot axis, wherein
the table bearing unit and the backrest unit, thereby having corresponding pivot axes, move together without a slotted guide.
2. The seat device as claimed in claim 1, wherein
at least one correspondence point of the table bearing unit is guided on a path of movement which at least partially corresponds with a path of movement of a correspondence point of the backrest unit.
3. The seat device as claimed in claim 1, wherein
the table bearing unit has a greater range of movement than the backrest unit.
4. The seat device as claimed in claim 1, further comprising
a sliding bearing unit via which the table bearing unit is guided in its movement.
5. The seat device as claimed in claim 4, wherein
the table bearing unit and the backrest unit are coupled via the sliding bearing unit.

\* \* \* \* \*